United States Patent [19]

Lohrentz

[11] Patent Number: 4,894,979
[45] Date of Patent: Jan. 23, 1990

[54] SICKLE GUARD HAVING ADJUSTABLE KNIFE SECTION HOLD-DOWN STRUCTURE

[75] Inventor: Howard R. Lohrentz, Hesston, Kans.

[73] Assignee: Hesston Corporation, Hesston, Kans.

[21] Appl. No.: 498,412

[22] Filed: May 26, 1983

[51] Int. Cl.⁴ .............................................. A01D 34/18
[52] U.S. Cl. ...................................................... 56/305
[58] Field of Search .................. 56/296, 298, 305, 307

[56] References Cited

U.S. PATENT DOCUMENTS

| | | | |
|---|---|---|---|
| 572,402 | 12/1896 | Barclay | 56/305 |
| 1,583,167 | 5/1926 | Pehrson | 56/305 |
| 3,098,338 | 7/1963 | Myers | 56/307 |
| 3,099,125 | 7/1963 | Turner | 56/298 |
| 3,162,991 | 12/1964 | Maxant | 56/305 |
| 3,314,222 | 4/1967 | Scarnato et al. | 56/305 |
| 3,455,093 | 7/1969 | Stern | 56/305 |
| 3,715,845 | 2/1973 | Braunberger | 56/305 |
| 3,722,196 | 3/1973 | Templeton | 56/298 |
| 4,387,554 | 6/1983 | Bedogni | 56/298 |

FOREIGN PATENT DOCUMENTS

| | | | |
|---|---|---|---|
| 1123860 | 8/1963 | Fed. Rep. of Germany | 56/305 |
| 601456 | 3/1926 | France | 56/305 |

*Primary Examiner*—Paul J. Hirsch
*Attorney, Agent, or Firm*—Hovey, Williams, Timmons & Collins

[57] ABSTRACT

The upper and lower finger portions of the sickle guard comprises two separate components which are disconnected at their tips so that the knife sections of the sickle can project forwardly beyond at least one of the fingers during operation and thereby provide a self-cleaning action for the gap defined between the two fingers and through which the sickle reciprocates. The size of the gap can be precisely adjusted for maximum cutting efficiency through the use of an adjusting set screw adjacent the rear of each upper finger which incrementally forces the two fingers apart in a fulcruming action to the extent permitted by mounting bolts of the guard when the screw is operated.

6 Claims, 1 Drawing Sheet

SICKLE GUARD HAVING ADJUSTABLE KNIFE SECTION HOLD-DOWN STRUCTURE

TECHNICAL FIELD

This invention relates to sickle assemblies and, more particularly, to an improvement in the guard structure of such an assembly through which a sickle thereof reciprocates.

BACKGROUND OF THE INVENTION

Crop harvesters or mowers are typically provided with sickle assemblies which include a reciprocating sickle provided with generally triangular-shaped knife sections and suitable stationary, pointed guards which are typically slotted to receive the horizontally moving sickle. The guards serve the dual purpose of providing co-acting shear surfaces for the knife sections and protection against breakage of the sickle from rocks and other obstructions encountered in the field.

Although it is fairly standard for such guards to have points or fingers which are simply slotted to receive and confine the reciprocating sickle, in certain fine, light grass situations it has been found that a different type of guard is more effective than the standard slotted variety. In this respect, the assignee of the present invention has for many years manufactured and sold so-called "stub" guards in which the upper and lower halves of the guard are two separate pieces so that the gap or slot in which the sickle reciprocates is open at the tips of the guards instead of being closed as in the standard, slotted guards. Consequently, it is possible to have the knife sections project slightly through and beyond the guard tips during reciprocation and thereby effect a self-cleaning action within the gap. Without this action, and using the standard, slotted guard, there is a tendency for the slender grass stems to hairpin over the edge of the gap instead of becoming fully severed and to thus collect and clog up the gap area. Eventually, this prevents the knife sections from properly entering the gap and, instead, causes them to deflect upwardly or downwardly to impact with the sides of the guards and shatter. Replacement of the knife sections is a tedious and time-consuming operation which is particularly frustrating at harvest when time is at a premium.

The open-ended sickle gap of prior stub guards is thus quite beneficial and yet the size of the gap itself is critical insofar as proper cutting action is concerned. In this respect, it will be appreciated that the knife sections are subjected to irregular yet significant upward loading forces as the sections engage and sever the standing crops. Thus, there is a tendency for the sections to deflect upwardly unless restrained by the overlying upper fingers of the guards. If such deflection and upward movement is too great, the proper cooperative shearing action between the knife sections and the upper ledger surface of the bottom guard fingers will not take place; hence the grass stems will simply hairpin over the edges of tee lower guard fingers and be shoved into the gap by the knife sections instead of being severed in the intended manner. This, then, results in the knife breakage problem as mentioned above.

Heretofore, in order to adjust the size of the gap on stub guards, it has been necessary to place an appropriate number of shims between the upper and lower fingers so that when the fingers were bolted down together on the cutter bar, the size of the stack of shims would determine the spacing between the fingers and thus the size of the gap. Manifestly, adding more shims or taking others away as necessary along the twelve-to fourteen-foot length of the sickle assembly comprises a tedious, time-consuming task made all the more frustrating and bothersome by the fact that the bolts and other loose components are easily lost and misplaced after disassembling the guard each time a shim is to be added or removed. This itself, therefore, discourages proper adjustment of the gap and simply exacerbates the poor cutting and excessive sickle breakage problem.

SUMMARY OF THE INVENTION

Accordingly, one important object of the present invention is to provide a way in which the size of the open-ended gap within which the knife sections reciprocate through a guard can be quickly and easily adjusted to maximize cutting efficiency and minimize down time and knife breakage.

Pursuant to the foregoing, the present invention contemplates making the necessary adjustment by merely slightly loosening mounting bolts which fasten the guards to the cutter bar and then turning one or more adjusting screws in the appropriate direction until the upper fingers of the guard in question have been moved toward or away from the underlying lower fingers in the precisely desired amount, thereafter retightening the bolts to return the guard into operating condition. Preferably, the threaded adjustment action is obtained via set screws located just forward of the fastening bolts for the guards to the cutter bar, and upon rotation of such screws, the upper fingers are caused to swing slightly upwardly or downwardly about a rearwardly located fulcrum point on the opposite, rearward side of the bolts. Although the rear ends of the upper fingers at the fulcrum points move hardly at all, the lever arm effect is such that movement at the forward tips of the upper fingers is magnified considerably such that only a slight manipulation of the set screw is required to effect corresponding, larger scale incremental movement at the tips of the upper fingers, all to the extent permitted by the fastening bolts. Preferably also, the set screws and fulcrum points of the upper fingers bear downwardly against a shim added to the cutter bar support for the guards, which shim can be provided with an overhanging forwardmost portion which overlies the rear edge of the sickle and thereby serves to assist in holding the latter downwardly in place during reciprocation thereof.

BRIEF OF THE DRAWINGS

DETAILED DESCRIPTION

Figure 1:
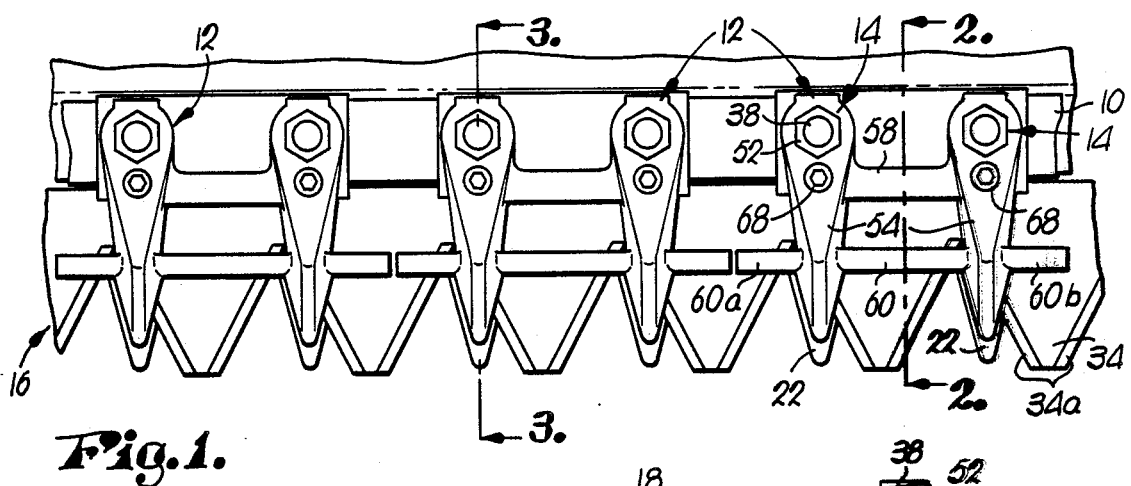
FIG. 1 is a fragmentary, top plan view of a sickle assembly employing guards constructed in accordance with the present invention.
Figure 2:
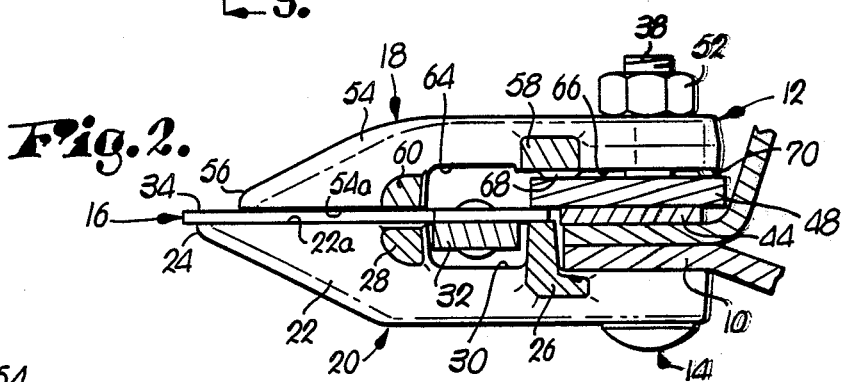
FIG. 2 is an enlarged, transverse cross-sectional view thereof taken substantially along line 2-2 of FIG. 1.

The harvester or other machine with which the sickle guard of the present invention is utilized has a bifurcated support, commonly called a "cutter bar" 10 which normally extends horizontally across the path of forward travel of the machine. A plurality of guards 12 are attached to the cutter bar 10 by fastener means in the nature of carriage bolts 14, and the guards 12 serve to shiftably support and protect a reciprocating sickle broadly denoted by the numeral 16 and driven by means not shown in a path of travel extending parallel to the cutter bar 10 in front of the latter.

Each of the guards 12 comprises upper and lower halves 18 and 20 respectively which are held in position on the cutter bar 10 by the carriage bolts 4 as will hereinafter be described in more detail. The lower half 20 of each guard 12 includes a pair of laterally spaced-apart, identical, forwardly projecting fingers 22 terminating in pointed, forwardmost tips 24 and retained in laterally spaced relationship by a rearwardly disposed transverse bridge 26 and a forwardly and slightly upwardly disposed transverse bridge 28, the forward bridge 28 having extensions 28a and 28b projecting laterally outwardly from opposite ones of the lower fingers 22. The rear bridge 26 extends across the upper faces of the lower fingers 22 and cooperates with a corresponding portion of the front bridge 28 across the upper surfaces of lower fingers 22 to define a transverse channel 30 across each of the fingers 22 within which the backing bar 32 of the sickle 16 may move during reciprocation of the latter. The rearmost extremity of the triangular knife sections 34 of the sickle 16 rests upon the upper surface of the rear bridge 26 during reciprocation of the sickle 16, while the main portion of the knife sections 34 rests upon the upwardly facing flat surface 22a of each finger 22 during reciprocation. Sharp, beveled edges 34a of the knife sections 34 thus move back and forth across the finger surfaces 22a during operation and cooperate with the opposite, tapering edge extremities of the surfaces 22a in a scissor-like action for crop severance.

Figure 3:
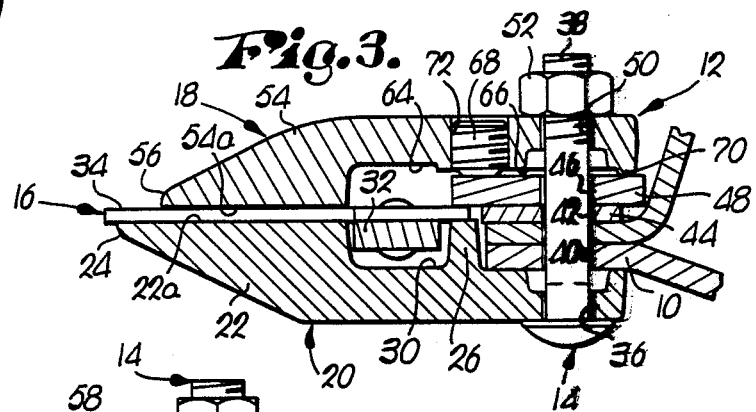
FIG. 3 is a transverse cross-sectional view thereof taken substantially along line 3-3 of Fig. 1.
Figure 5:
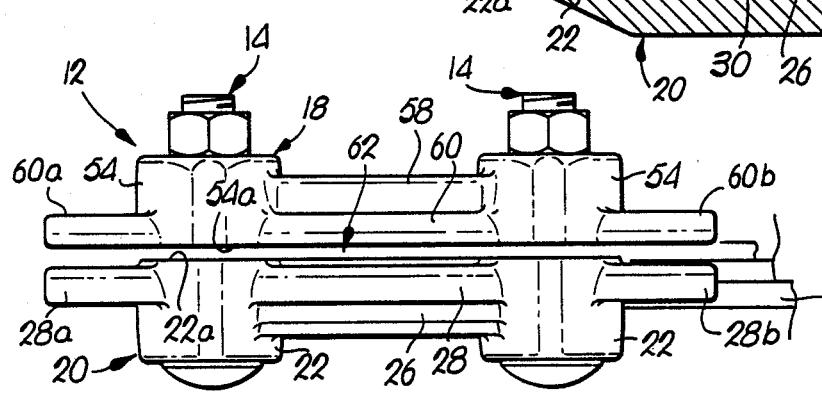
FIG. 5 is a fragmentary, front elevational view of a guard of the sickle assembly with the sickle thereof removed for clarity.

The rear ends of the lower fingers 22 are provided with mounting holes 36 through which the shank 38 of the corresponding carriage bolt 14 may pass in order to attach the lower guard half 20 to the cutter bar 10. As shown in FIG. 3, after passing through the holes 36, the shank 38 passes upwardly through a hole 40 in the cutter bar 10, a hole 42 in a first spacer 44, a hole 46 in a second spacer or shim member 48, and ultimately through a hole 50 in the rear extremity of the upper guard half 18, the latter being held down in place on the hank 38 by a nut 52.

The upper half 18 of each guard 12 likewise includes a pair of identical, forwardly projecting and laterally tapering fingers 54, each of which terminates in a forwardmost pointed tip 56. The two upper fingers 54 are interconnected at one location by a rearwardly disposed bridge 58 and at a second location by a forwardly disposed bridge 60, the latter having a pair of extensions 60a and 60b projecting laterally outwardly from opposite ones of the fingers 54. As illustrated, the tips 56 of upper fingers 54 are set back with respect to the tips 24 of lower fingers 22 to expose a forwardmost portion of the knife sections 34 when the latter are vertically aligned with the fingers 22, 54 during reciprocation, and it will be noted also in this respect that the knife sections 34 are slightly longer in a fore-and-aft U sense than the lower fingers 22 such that the forwardmost extremity of knife sections 34 projects slightly beyond the tips 24 of lower fingers 22 during operation and otherwise.

Figure 6:
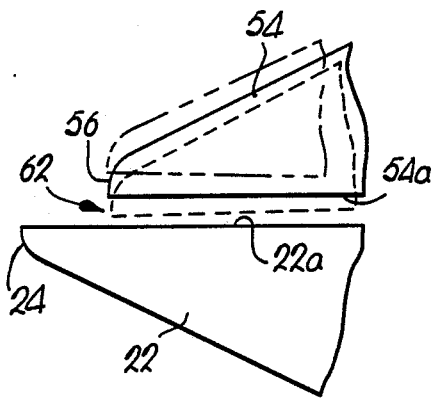
FIG. 6 is an enlarged, fragmentary elevational view of the tip of one of the guards illustrating in phantom lines the adjustable movement of the upper guard finger.
Figure 4:
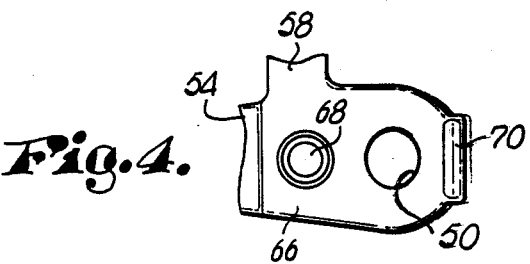
FIG. 4 is a fragmentary bottom plan view of an upper guard finger illustrating in particular the fulcrum projection and set screw thereof.

Each of the upper fingers 54 has a forward portion immediately behind the tip 56 thereof which is provided with a downwardly facing flat surface 54a overlying and in spaced opposition to the upwardly facing surface 22a of the corresponding lower guard finger 22, such two surfaces 22a and 54a thus cooperating to define a gap denoted by the numeral 62 in FIG. 6 through which the knife sections 34 may reciprocate. Rearwardly of the surface 54a, each upper finger 54 is provided with a downwardly facing, transverse notch 64 providing additional clearance for the reciprocating sickle 16, and rearwardly of each notch 64 the upper fingers 54 are respectively provided with a downwardly facing flat face 66 from which a pair of projection structures 68 and 70 depend for engagement with the top surface of the shim 48. The rearmost projection 70 is fixed in position and serves as a fulcrum during adjustment of the gap 62 as will hereinafter be made apparent, while the forwardly disposed projection 68 is extendable and retractable relative to the face 66 and the rear projection 70. Preferably, each forwardly disposed projection 68 is in the nature of an externally threaded set screw matingly received within an internally threaded through hole 72 in the corresponding finger 54 such that access to the screw projection 68 may be obtained from the top exterior of the guard 12 using an appropriate wrench tool. As noted, the two projections 68 and 70 for each upper finger 54 are disposed on opposite fore-and-aft sides of the corresponding carriage bolt 14.

OPERATION

Generally speaking, it will be apparent from the foregoing description that as the sickle 16 is reciprocated, the knife sections 34 move back and forth across the cooperating upper surfaces 22a of the lower fingers 22 in order to provide a scissor-like severing action. So long as the width of the gap 62 between the surfaces 22a and 54a is not excessive, efficient severing action will occur in the intended manner. However, if due to wear or other circumstances the gap 62 should become inordinately large, the operator may then briefly terminate reciprocation of the sickle 16 and readily adjust the gaps 62 of those guards 12 in need of such adjustment.

For example, assuming that the gap 62 is excessively large, it is but necessary to rotate the appropriate set screw 68 in such a direction as to retract the same within its hole 72 so that the corresponding upper finger 54 may be rocked down about the rear fulcrum projection 70 to bring the tip 56 closer to the lower finger 22 in the manner illustrated in FIG. 6. Then, simply retightening the appropriate one or more nuts 52 of the carriage bolts 14 will secure the adjusted upperfinger 54 against loose, vibratory movement during sickle operation.

On the other hand, if for some reason it is necessary to enlarge the gap 62, it is but necessary to loosen one or more of the appropriate carriage bolts 14 a slight extent and to then rotate the appropriate set screw 68 in such direction as to extend the same from its hole 72 whereby to rock the corresponding upper finger 54 about the rear fulcrum projection 70 and move the tip 56 away from the lower finger 22 as illustrated in FIG. 6. Retightening of the nuts 52 thereupon firmly reestablishes proper operating relationships between the various components of the guard 12.

Thus, it will be apparent that only those guard fingers 54 needing adjustment will require any loosening and/or tightening operations of their carriage bolts 14, and, moreover, the same is true of the set screws 68. Furthermore, it will be noted that at no time is it necessary adjustments; thus, any risk of losing or misplacing the loose parts once the guard is disassembled can be completely avoided.

In many cases it may not be necessary to loosen the carriage bolts 14 at all before making an adjustment. For example, if the width of the gap 62 requires only a minute amount of change, the appropriate screw 68 can be turned in the needed direction while the bolts 14 remain tight due to a slight amount of flexing available in the upper half 18 and the significant mechanical advantage achieved by locating the screws in front of the bolts 14 at a distance from the fulcrum projections 70.

Still further, it will be appreciated that the gap adjustment can be carried out in a very precise manner and in varying degrees as required by the individual circumstances of the various guards on the machine. Instead of inserting and removing shims of standard thicknesses, each gap 62 can be adjusted by that amount which is precisely necessary for its particular situation. Even the two upper fingers 54 of the same guard 12 can be adjusted relative to each other to some extent.

I claim:

1. A cutter assembly for crop harvesting apparatus comprising:
   support bar means having a plurality of forwardly extending, laterally spaced apart lower guard fingers secured thereto;
   a sickle shiftably carried by said fingers for transverse reciprocation relative thereto;
   a plurality of forwardly extending, laterally spaced apart upper guard fingers secured to said bar means above said sickle in overlying relation ship to respective ones of said lower finger whereby to define a sickle-receiving gap between the upper and lower fingers;
   elongated fastener means attaching said fingers to said bar means and tending to hold the same against relative movement increasing the size of said gap; and means for adjustably relatively shifting said upper and lower fingers toward and away from each other to vary the size of said gap,
   said adjustment means comprising a downwardly extending projection on each of said upper fingers disposed rearwardly of said fastener means and bearing against said bar means, said adjustment means further comprising a set screw projecting downwardly from each of said upper fingers forwardly of said fastener means and bearing against said bar means for separating the fingers and enlarging the gap therebetween when the set screws are adjustably extended downwardly from the upper fingers.

2. An assembly as claimed in claim 1, said bar means including a shim and a cutter bar, said shim and said cutter bar having clearance holes therein for said fastener means.

3. An assembly as claimed in claim 1, the leading tips of said upper fingers being set back rearwardly from the leading tips of said lower fingers and from the leading extremity of said sickle.

4. A sickle guard comprising:
   at least one elongated, normally forwardly projecting lower guard finger;
   at least one elongated, normally forwardly projecting upper guard finger overlying said lower finger and disconnected from the latter adjacent the normally leading end thereof;
   means for fastening said fingers onto a common support adjacent the normally rear ends thereof for reciprocation of a cooperating sickle through a gap defined between opposed, forwardly disposed portions of said fingers; and
   structure operably associated with said fingers and separate from said fastening means for adjustably separating said opposed finger portions to the extent permitted by said fastening means whereby to vary the size of said gap,
   said structure including a pair of fore-and-aft spaced apart, support-engaging projections depending from said upper finger on opposite fore-and-aft sides of said fastening means, one of said projections being extensible relative to the other whereby to effect said separating movement of the fingers by rocking the upper finger relative to the lower about said other projection,
   said one projection comprising the forwardly disposed projection of the pair whereby to separate said finger portions and increase the size of said gap therebetween when said one projection is adjustably extended below the upper finger.

5. A sickle guard as claimed in claim 4 wherein said one projection comprises a set screw threadably received by and extending through said upper finger.

6. A sickle guard as claimed in claim 4, wherein said support includes a plurality of members stacked one upon the other, the uppermost of said members having a normally leading edge adapted to overhang the normally trailing edge of a sickle when the latter is received between the fingers.

* * * * *